United States Patent [19]
Kleinhans et al.

[11] Patent Number: 5,570,775
[45] Date of Patent: Nov. 5, 1996

[54] APPARATUS FOR THE RELEASE OF A PRODUCT FROM A CONTINUOUSLY CIRCULATING BELT

[75] Inventors: Matthias Kleinhans, Waiblingen; Eckhard Heinisch, Affalterbach, both of Germany

[73] Assignee: Santrade Ltd., Lucerne, Switzerland

[21] Appl. No.: 532,717

[22] PCT Filed: Jan. 28, 1995

[86] PCT No.: PCT/EP95/00302

§ 371 Date: Nov. 29, 1995

§ 102(e) Date: Nov. 29, 1995

[87] PCT Pub. No.: WO95/22498

PCT Pub. Date: Aug. 24, 1995

[30]       Foreign Application Priority Data

Feb. 18, 1994 [DE] Germany ............................ 44 05 197.2

[51] Int. Cl.⁶ ............................................. B65G 47/74
[52] U.S. Cl. ............................ 198/635; 198/637; 271/311
[58] Field of Search .......................... 198/633, 635, 198/634, 497, 498, 499; 271/311

[56]           References Cited

U.S. PATENT DOCUMENTS 2,697,508  12/1954  Watts ..................................... 198/635
3,863,755  2/1975   Hartwig ................................. 198/637
3,912,256  10/1975  Nagahara ............................... 271/311
4,065,120  12/1977  Imaizumi et al. ...................... 271/311
5,161,666  11/1992  Pope ...................................... 148/498

FOREIGN PATENT DOCUMENTS 844 880  8/1952  Germany .
768 202  2/1957  United Kingdom .

Primary Examiner—James R. Bidwell
Attorney, Agent, or Firm—Burns, Doane, Swecker & Mathis, L.L.P.

[57]           ABSTRACT

An endlessly driven belt extends around a drum and carries a product. Removal of the product from the belt is effected by a doctor blade which bears against a portion of the belt traversing the drum. The doctor blade is fixedly connected to the drum for movement therewith to remain parallel to a surface of the belt. The doctor blade is attached to shafts that are mounted in respective bearing assemblies that permit movement of the shafts along their mutually aligned axes. The doctor blade can be positioned between upstanding ribs formed on the belt whereby the ribs can displace the doctor blade in response to pivoting of the drum in order to keep the doctor blade parallel to the axis of the drum.

8 Claims, 3 Drawing Sheets

APPARATUS FOR THE RELEASE OF A PRODUCT FROM A CONTINUOUSLY CIRCULATING BELT

BACKGROUND OF THE INVENTION

The invention pertains to a device for the release of a product from a continuously circulating belt of a belt conveyor or of a double-belt machine, particularly of a double-belt press, in the region of a discharge drum which turns the belt. The drum is mounted on two oppositely positioned lateral bearing cradles and tilts in a horizontal plane in response to a linear movement of at least one of the two bearing cradles. A doctor blade extends perpendicular to the feed direction across the width of the belt and having a cutting edge positioned against the belt surface.

Release of products from a continuously circulating belt of a belt conveyor or on a double-belt machine in the region of a run-out drum with the help of a doctor blade is well known. In order to achieve a uniform and safe release of product from the belt over its entire width, the edge of the doctor blade must lie against the belt surface uniformly over its entire width, i.e. arranged parallel. This leads to problems in belts which can be displaced about a vertical pivoting axis perpendicular to their feed direction in a horizontal plane through a pivoting of the run-out drum since the distance of the edge of the doctor blade to the surface of the belt wound around the run-out drum changes over the width of the belt.

It is the object of the invention to create a device of the above named type, which ensures uniform release of product over its entire width even during a lateral displacement of the belt on the run-out drum.

SUMMARY OF THE INVENTION

This objective is attained by holding the doctor blade in the area of its opposite sides in a guide cradle each rigidly connected to the corresponding run-out drum bearing cradle with a linear guiding means to allow the doctor blade to move linearly in its axial direction, a pivot bearing to align the doctor blade parallel to the respective pivoted position of the rotating axis of the run-out drum, as well as a steering means for an axial movement of the doctor blade according to a lateral displacement of the belt resulting from a pivoted position of the run-out drum. In this way the doctor blade is coupled to the pivoting movement of the run-out drum and thereby to the lateral displacement of the belt. With the lateral sliding and positioning of the doctor blade, it is assured that the edge is always located parallel to the rotating axis of the run-out drum and thereby always in uniform distance to the surface of the belt so that the product is scraped uniformly from the belt as well in a tilted positioning of the run-out drum. The doctor blade thus follows the movement of the run-out drum and the lateral movement of the belt. With the linear freedom of the doctor blade and the steering means, linear balancing is effected in the lateral positioning of the doctor blade relative to the belt so that the doctor blade is always located at an equal height relative to the belt. Thus it is assured that the doctor blade is always aligned concentric to the belt and a uniform release of product over its entire width is achievable.

In a manifestation of the invention, the linear guiding means and the pivot bearing are combined into a compact construction unit. A compact arrangement of the mounting of the doctor blade in the lateral guide cradles results.

In another manifestation of the invention, a roller bearing which guides a bearing shaft of the doctor blade is provided as the linear guide means. In another manifestation, the pivot bearing is arranged coaxially about the roller bearing. Thus the roller bearing for the linear guiding of the doctor blade is arranged within the pivot bearing, whereby a relatively small construction width for the mounting of the doctor blade results.

In another manifestation of the invention the compact construction unit has a pivot roller bearing carrying the bearing shaft of the doctor blade. This pivot roller bearing thus assumes the linear guiding as well as the pivoting movement of the doctor blade. Understandably the bearing shaft of the doctor blade is constructed long enough that it does not slide off the pivot roller bearing during a lateral shift along the belt surface.

In another manifestation of the invention a motor for oscillating movement of the doctor blade is installed parallel to the turning axis of the run-out drum. A back and forth cutting motion of the doctor blade in rapid fashion is achieved, which results in an improved release of the product from the belt. In a simple way, the motor grips onto one of the two bearing shafts of the doctor blade.

In another manifestation of the invention, the width of the doctor blade corresponds to the distance of two weirs to one another attached to and encircling the belt, and the doctor blade is guided between the two weirs parallel to the rotating axis of the run-out drum. Thus, the doctor blade is automatically shifted in conjunction with a lateral displacement of the belt, since it is arranged between the two weirs. The weirs are therefore steering means for the axial travel of the doctor blade.

BRIEF DESCRIPTION OF THE INVENTION

Further advantages and special features of the invention are given in the subclaims as well as from the following description of examples of embodiment of the invention, which are represented by the illustrations.

FIG. 1 shows schematically in a side view a first embodiment of a release device according to the invention which is arranged in the area of a run-out drum of a lower belt of a double-belt machine and which has a doctor blade, FIG. 2 shows a schematic top view of the lower belt and the release device in the area of the run-out drum, FIG. 3 shows a detailed section through the lateral bearing of the doctor blade of the release apparatus according to FIGS. 1 and 2 in the area of a guide cradle, whereby the doctor blade is moveable and pivotally arranged perpendicular to the travelling direction of the belt, and FIG. 4 shows schematically a top view of another embodiment of a release device according to the invention similar to FIG. 2, in which the doctor blade is moved passively between two weirs arranged on the belt during a lateral shift of the belt.

DETAILED DESCRIPTION PREFERRED EMBODIMENTS OF THE INVENTION

Figure 1:
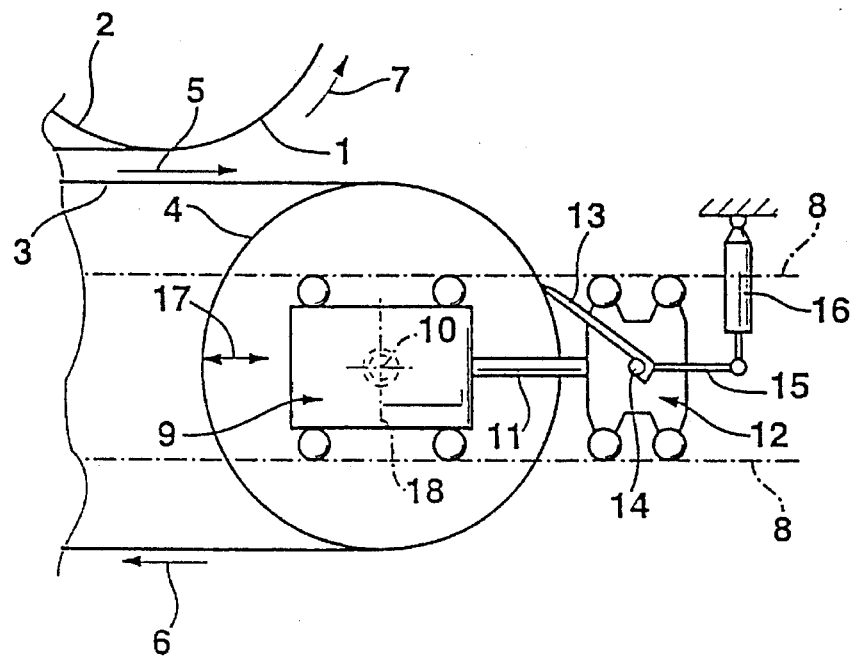

A release device according to FIG. 1 serves to release a product handled in a double-belt press, from a lower belt (3) of the double belt press. In an embodiment of the invention not represented, the release device according to FIGS. 1 through 3 could be employed in a belt conveyor with only one circulating belt, for example a belt cooler. The principle construction of the release apparatus does not change. The double-belt press has, in well known fashion, an upper belt (1) which runs continuously in the direction of the arrow (7) around two drums, one of which is represented in FIG. 1 by a run-out drum (2) in the area of discharge of the double-belt press. Parallel to the upper belt (1) is the lower belt (3) wound around two opposing drums continuously of which the back drum, seen in the travelling direction (5) of the product, represents a run-out drum (4). The two bands of the belts (1 and 3) form a pressing gap between each other for the product to be treated. The lower belt (3) is extended in the travelling direction (5) over the upper belt (1) so that the ready-treated product is conveyed further on the lower belt (3) after the discharge from the pressing area. The belts (1 and 3) are steel belts in well known fashion. The lower belt (3) circulates in the direction of the arrow (6). The run-out drum (4) is held in place turnably on both sides by corresponding bearing cradles (9). On each side of the run-out drum (4), guide rails (8) are provided for each bearing cradle (9), which rails extend parallel to the travelling direction (5) of the belt. The guide rails (8) support each bearing cradle (9) from above and from below, so that each bearing cradle (9) is moveable parallel to the travelling direction (5) of the belt (3) in the direction of the double arrows (17). Rollers R, on the upper side as well as the lower side of each bearing cradle (9) are provided for this purpose.

Figure 2:
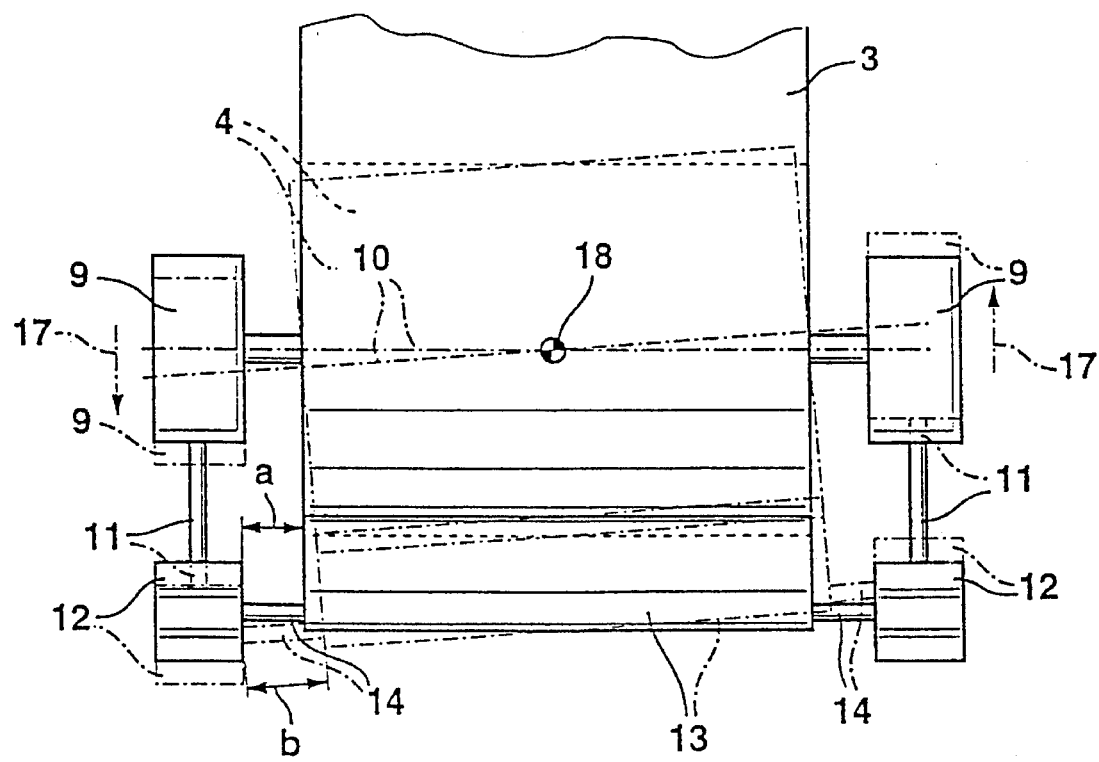
Figure 3:
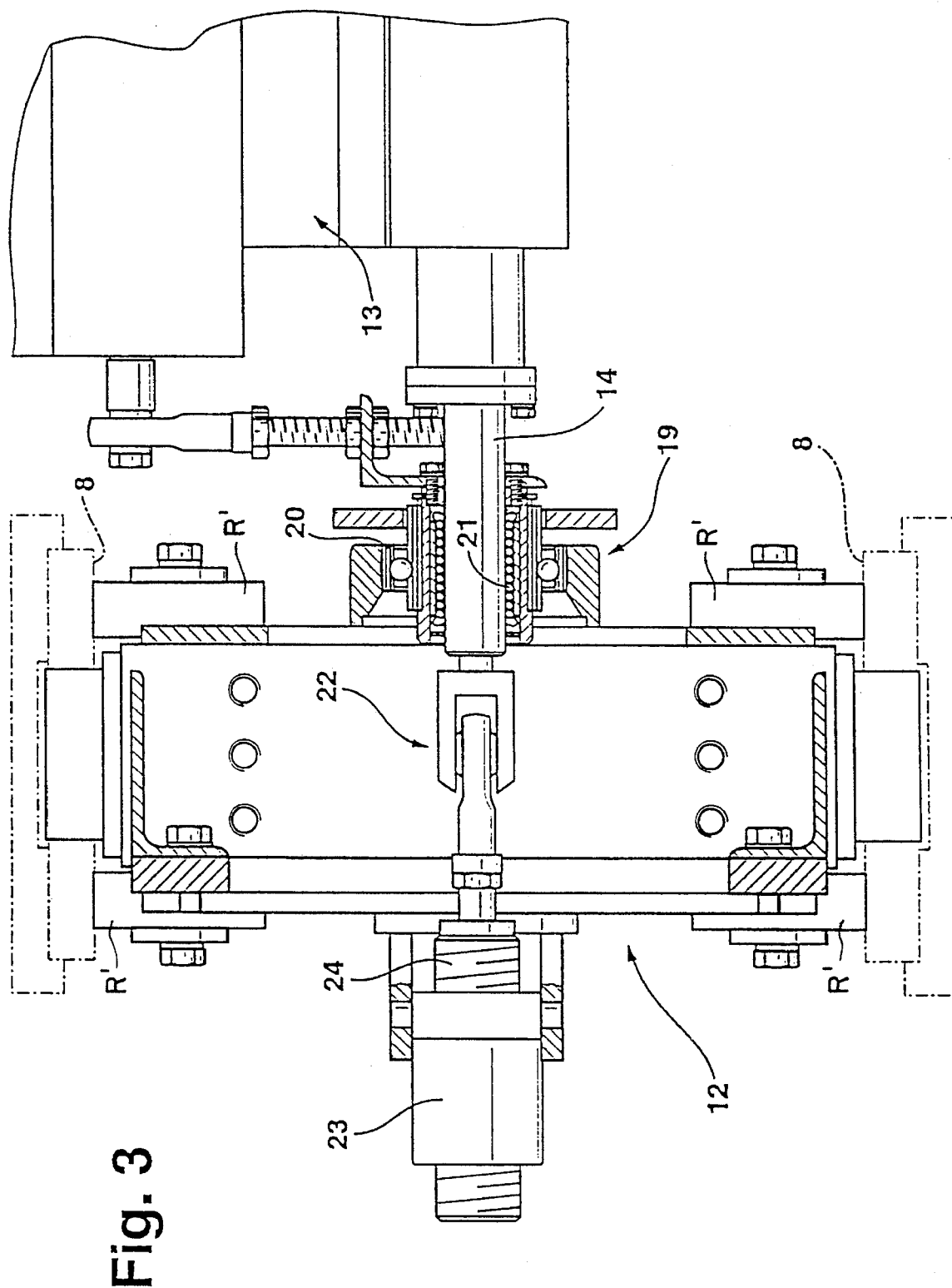

The release device for release of the product from the lower belt (3) has a doctor blade (13), which is positioned opposite the travel direction (5) of the product against the surface of the belt (3) approximately at the height of the upper guide rail (8). The doctor blade (13) stretches over the entire width of the belt (3) and strips or peels the product from the belt (3), whereupon the product glides over the top side of the doctor blade and is fed in appropriate manner to the next processing step. The doctor blade (13) corresponds to the width of the belt (3) and is constructed in platelike form. On its two opposite sides the doctor blade (13) is held in place by a corresponding bearing shall (14) in a respective lateral guide cradle (12) (FIGS. 2 and 3). Each bearing shaft (14) is connected rigidly with the doctor blade. In order to be able to change the pressure of the doctor blade (13) against the surface of the belt (3) and occasionally to lift the doctor blade (13) from this surface, a lever (15) is attached rigidly with the doctor blade by means of which the doctor blade (13) can be pivoted in the guide cradle about a pivoting axis defined by the central longitudinal axis of the two bearing shafts (14). This pivoting axis is parallel to a turning axis (10) of the run-out drum (4), which axis (10) extends likewise perpendicular to the travelling direction (5) of the belt (3). In order to be able to control automatically the lifting or compression movement of the doctor blade (13) relative to the belt (3), a stationary installed lifting cylinder (16) grips the lever (15).

Each guide cradle (12) is connected to the corresponding bearing cradle (9) rigidly by means of a connecting stem (11). Each guide cradle (12) has guide rollers R' on its upper and its lower sides analogous to the bearing cradles (9), by which the cradle (12) is linearly moveable between the guide rails (8), depending on the movement of the rollers of the bearing cradle (9), in the direction of the arrow (17). During linear movement of the bearing cradle (9) in the direction of the arrow (17), a displacement and thereby a skewing pivoting of the run-out drum (4) in a horizontal plane occurs whereby a forced displacement of the lower belt (3) on the run-out drum arises in a direction perpendicular to the travelling direction (5) due to the turning movement of the run-out drum (4). The pivoting of the run-out drum (4) results from a linear movement of one of the two bearing cradles (9) independently of the opposite bearing cradle (9), or from an oppositely directed linear movement of the opposite bearing cradle (9) to varying degrees, or finally by a corresponding oppositely directed movement of the opposite bearing cradle (9) to the same degree, whereby a pivoting of the run-out drum (4) about a vertical central axis (18) arises. In the other possible linear movements of the bearing cradle, a pivoting of the run-out drum (4) about a vertical pivoting axis arises as well, but it is not displaced concentrically, but rather laterally. In the extreme case, in which only one bearing cradle moves, the geometric pivot axis runs through one of the lateral bearing cradles. The movement of the bearing cradle (9), and therewith also the pivoting of the run-out drum (4), is created by appropriate control motors, which grip both bearing cradles (9). The bearing of the shaft of the run-out drum (4) in each of the bearing cradles (9) is a pivot bearing in order to make possible a distinct pivoting of the shaft. In FIG. 2, such a pivoting of the run-out drum (4) is represented, whereby the representation is somewhat overstated for clarity. Sufficient lateral displacement of the belt (3) is achieved in practice with less pivoting of the turning axis (10) of the run-out drum.

The edge of the doctor blade (13) is pressed against the surface of the belt (3) with uniform pressure over the entire width of the belt (3) during the release operation. Since each guide cradle (12) is coupled rigidly to the lateral bearing of the doctor blade (13) on the corresponding bearing cradle (9), a corresponding forced pivoting of the doctor blade (13) arises with a pivoting of the run-out drum (4), whereby the edge of the doctor blade (13) constantly remains positioned parallel to the rotating axis (10) of the run-out drum (4) and thus also to the surface of the belt (3). As illustrated in FIG. 2, the lateral bearings must be provided with a linear balancing as necessary for the two bearing shafts (14) of the doctor blade (13) in the guide cradles (12). At a location spaced perpendicular to the rotating axis (10) there exists a distance (a) between the side edge of the doctor blade (13) and an interior side of the guide cradle (12) (b) upon, and respectively a distance pivoting of the turning axis (10). Correspondingly, the distance is shortened on the opposite side. The two opposing bearing shafts (14) of the doctor blade (13) are made sufficiently long, in order to balance the resulting maximal length differences corresponding to the maximal pivoting of the pivoting axis (10).

In FIG. 3, an embodiment of a lateral bearing (19) of the bearing shaft (14) in the guide cradle (12) is represented in detailed fashion. In order to allow a pivoting of the bearing shaft (14) relative to the respective guide cradle (12) moving linearly in the longitudinal direction of the belt (3), the bearing shaft (14) is mounted to the guide cradle by means of a pivot bearing (20) which is constructed as a ball bearing. In order to enable a linear motion of the doctor blade (13) parallel to the turning axis (10) of the run-out drum (4) independent of its degree of pivot, the bearing shaft (14) is held by a roller bearing (21) so as to be moveable in the axial direction. Through this it is possible to centralize the doctor blade (13) constantly in the middle of the belt (3) through an axial shift perpendicular to the travelling direction of the belt (3) so that the lateral edges of the doctor blade (13) constantly slide with the lateral edges of the belt (3). The lateral bearing (19) represents a combination of the pivot bearing (20) and the roller bearing (21), whereby the dual function of the tiltable and axially moveable positioning is achieved. The bearing (19) represents a compact construction unit, since the roller bearing (21) is arranged coaxial to the pivot bearing (20) inside the pivot bearing (20). With this compact construction, as shown in FIG. 3, the bearing (19) has only a small width.

In the embodiment examples represented according to FIG. 3, the axial shifting of the doctor blade (13) is controlled parallel to the turning axis (10) of the run-out drum (4) by a linear drive unit (23, 24) which grips the free side of the bearing shaft (14). This linear drive unit (23, 24) is coupled with the control of the longitudinal movement of the bearing cradle (9) and controlled by a central control unit. For transfer of the drive from a drive shaft (24) to the bearing shaft (14), a universal joint coupling (22) is provided, which also transfers an axial shifting to the bearing shaft (14) during a pivoting of the bearing shaft (14). By means of the linear drive unit (23, 24), it is additionally possible to carry out the longitudinal movement of the bearing shaft (14) and thereby of the doctor blade (13) in the form of an oscillating movement through which an improved cutting effect arises for the doctor blade (13).

Figure 4:
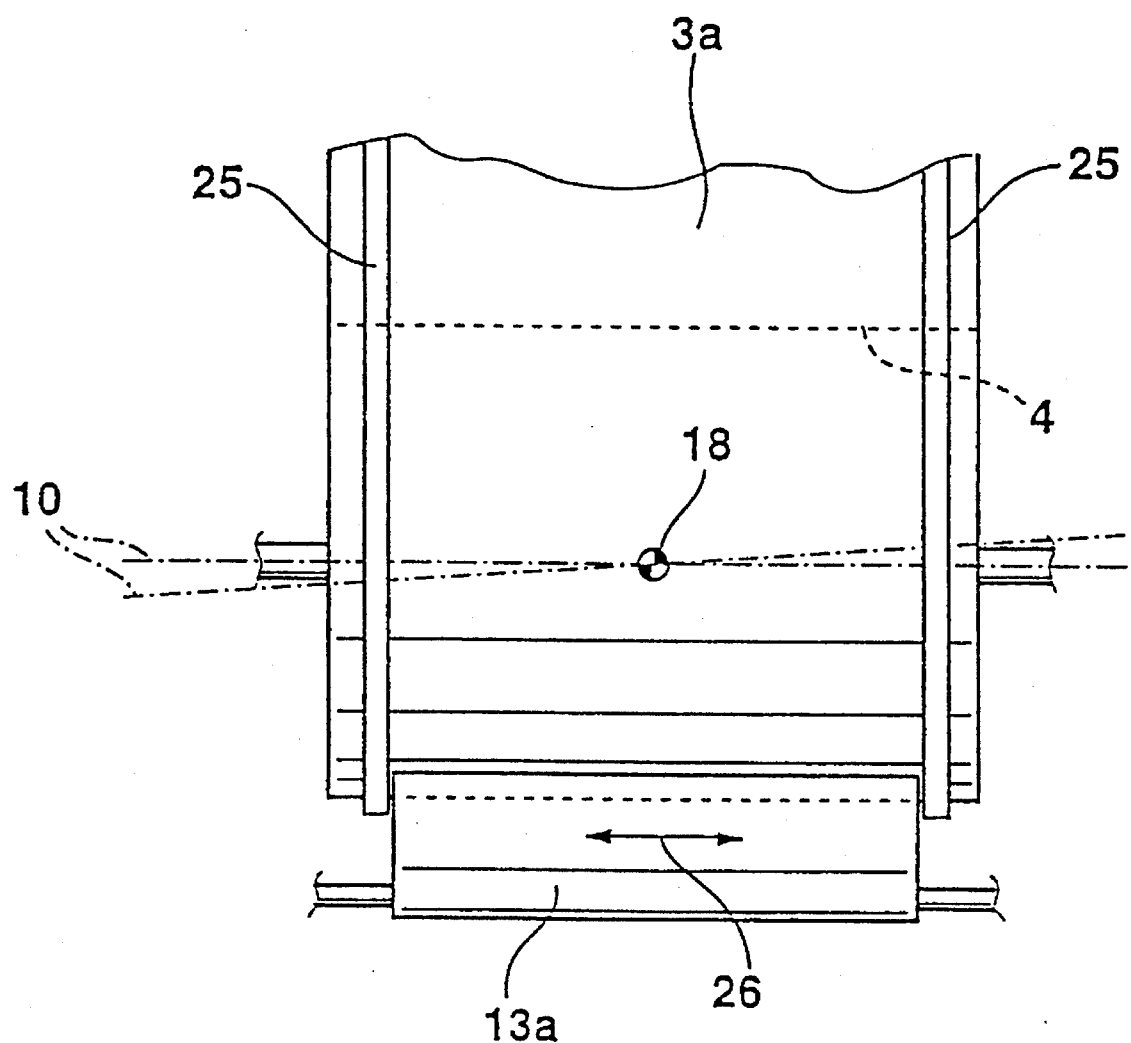

The lateral bearing of the doctor blade (13a) according to FIG. 4 corresponds essentially to the represented embodiment according to FIG. 3. In this embodiment, the doctor blade (13a) is not provided with a linear drive unit for a longitudinal movement of the doctor blade (13a) perpendicular to the feed direction of the belt (3a). Rather, the doctor blade (13a) is moved much more passively in the direction of the double arrow (26), in that it is arranged between two weirs or upstanding ribs (25) of the belt (3a). The weirs (25) project up perpendicular from the surface of the belt (3a) and are rigidly attached to the belt (3a). They form the lateral product boundary during the conveying on the belt (3a). In a pivoting of the run-out drum (4) about a vertical pivot axis (18), illustrated with the dashed turning axis (10), a forced perpendicular displacement of the belt (3a) arises. The corresponding pivoting and linearly moving doctor blade (13a) is passively moved along by a displacement of the belt in that it approaches one of the two weirs (25) according to the degree of pivot of the ran-out drum (4) and is pushed in the respective direction by it. The doctor blade (13a) remains constantly centralized within the belt (3a) in every pivoted position of the ran-out drum (4) through the lateral support of the two weirs (25).

We claim:

1. Apparatus for releasing a product from a continuously circulating belt of a belt conveyor or double-belt press, in the region of a drum guiding the belt, the drum being rotatable about a horizontal axis formed by two horizontal axle portions mounted in respective lateral bearing cradles, the drum being susceptible to skewing in a horizontal plane in response to linear movement between the bearing cradles in a horizontal plane, a doctor blade having a length extending across the width of the belt in a direction perpendicular to the feed direction and having an edge positioned against a belt surface for releasing of the product, the doctor blade having shafts at opposite ends thereof supported in respective guide cradles, each guide cradle coupled rigidly to a respective bearing cradle and including a linear guide element for accommodating linear motion of the doctor blade in the lengthwise direction of the doctor blade, a pivot bearing supporting each end of the doctor blade for pivoting to enable the doctor blade to remain parallel to a rotary axis of the drum, and a control mechanism for moving the doctor blade in response to a lateral displacement of the belt resulting from skewing of the drum.

2. The apparatus according to claim 1, wherein each linear guide element is supported by a respective pivot bearing to be pivotably movable relative thereto.

3. The apparatus according to claim 2, wherein the linear guide element comprises a lower bearing for guiding a respective shaft of the doctor blade.

4. The apparatus according to claim 3, wherein the pivot bearing is arranged coaxially about the roller bearing.

5. The apparatus according to claim 4, wherein the roller bearing is a self-aligning roller bearing.

6. The apparatus according to claim 1, wherein the control mechanism comprises a linear drive unit for reciprocating the doctor blade in its lengthwise direction.

7. The apparatus according to claim 6, wherein the linear drive unit is connected to one of the two shafts of the doctor blade.

8. The apparatus according to claim 1, wherein the belt includes two upstanding ribs encircling the belt, the doctor blade disposed between the ribs and having a width corresponding to a spacing between the ribs, the ribs engaging and displacing the doctor blade to maintain the doctor blade parallel to the rotary axis of the drum.

\* \* \* \* \*